L T GILLETT & S. J. ULREY.
DEVICE FOR COUPLING AND UNCOUPLING SECTIONAL METALLIC PIPE LINES.
APPLICATION FILED NOV. 17, 1908.
921,973.
Patented May 18, 1909.
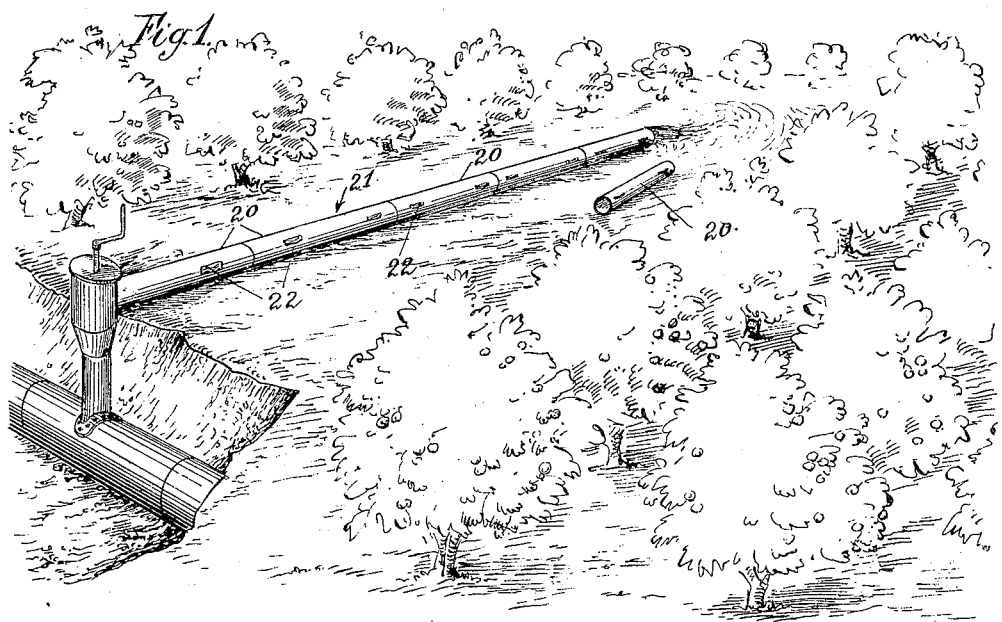
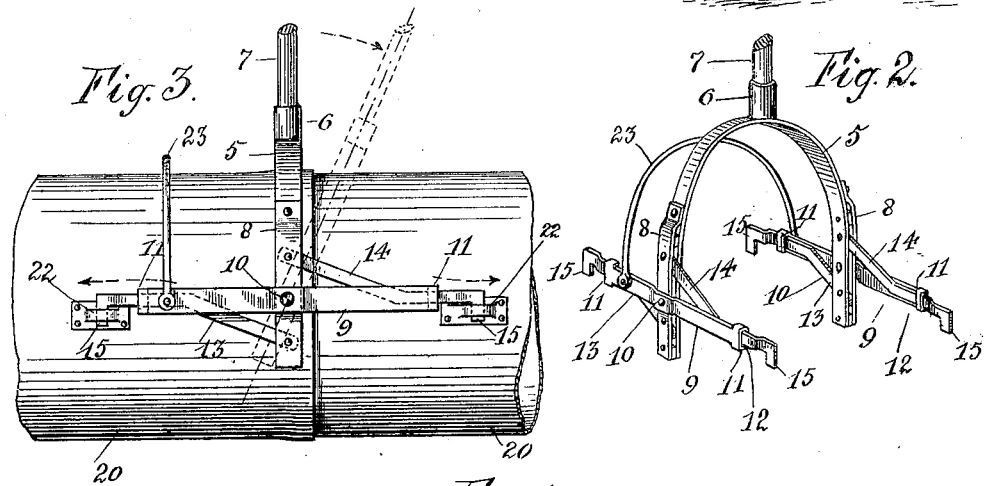
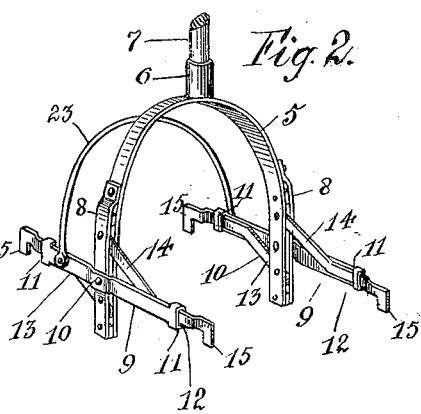
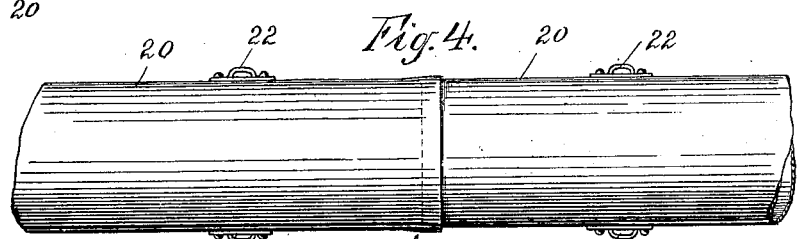
Witnesses,
Inventors,
L. T. Gillett,
Sidney J. Ulrey,
Attorneys

UNITED STATES PATENT OFFICE.

L T GILLETT, OF CLAREMONT, AND SIDNEY J. ULREY, OF ONTARIO, CALIFORNIA.

DEVICE FOR COUPLING AND UNCOUPLING SECTIONAL METALLIC PIPE-LINES.

No. 921,973.   Specification of Letters Patent.   Patented May 18, 1909.

Application filed November 17, 1908. Serial No. 463,105.

*To all whom it may concern:*

Be it known that we, L T GILLETT, residing at Claremont, in the county of Los Angeles, and SIDNEY J. ULREY, residing at Ontario, in the county of San Bernardino, both in the State of California, and both citizens of the United States, have invented new and useful Improvements in Devices for Coupling and Uncoupling Sectional Metallic Pipe-Lines, of which the following is a specification.

Our invention relates to a manually operated leverage mechanism especially adapted for connecting and disconnecting sections of metallic irrigating pipe lines used for distributing water at distances from the source of supply, and a main object is to provide a simple and efficient mechanism, whereby pipe line sections may be readily connected or disconnected when empty or while water is flowing therethrough without subjecting the operator to personal discomforts and without injury to the pipe.

Another object is to provide a device composed of few parts that may be quickly and easily attached to or detached from a pipe line, and which is positive and efficient in operation.

Heretofore in the irrigation of large ranches, underground concrete or metallic pipe lines having stand pipes controlled by gate valves, have been employed. When it was found desirable to irrigate portions of the ranches that lay at a considerable distance from a stand pipe, sectional surface pipe lines have been used successfully. These lines are preferably composed of a number of metallic sections usually six or more inches in diameter connected together by telescoping their adjacent ends. This method of connecting the sections together has been found to be extremely inconvenient, as the sections are often forced or wedged so tightly together as to prevent disconnection by usual means, the ends of the sections being often bent out of shape in endeavoring to force them together to prevent leakage, besides subjecting the operator to many inconveniences, such as wetting etc.

By means of our improved device the connections and disconnections of the sections of a metallic pipe line are quickly and easily accomplished without subjecting the operator to the above recited inconveniences or the slightest injury to the sections of the line.

In the attainment of the above objects we preferably employ a manually operated leverage mechanism of few parts, that is adapted to engage lugs or U-shaped rings attached to the pipe line sections.

In the drawings: Figure 1— is a perspective view of a pipe line having a stand pipe secured thereto, the sectional line being operatively secured to the stand pipe and extending therefrom to an orchard. Fig. 2— is a perspective view of the leverage device. Fig. 3— is a side elevation of two pipe line sections secured together, with our improved device in place thereon, the dotted position indicating the position assumed when forcing the sections apart. Fig. 4— is a plan view of two pipe line sections secured together showing the lugs or rings secured thereto.

Referring more particularly to the drawings, and especially Fig. 2, 5 designates a yoke shaped member preferably formed of flat steel or malleable iron, as that material possesses sufficient strength to withstand rough usage. At approximately the center of this yoke is a socket 6 adapted to receive the lower end of an operating handle 7, by means of which the leverage mechanisms secured to the lower ends of the yoke are operated, and which will be described more particularly hereinafter.

To the outer faces of the yoke ends and extending upwardly from the extreme ends thereof to approximately the center of the yoke are straps 8 riveted or otherwise secured thereto, which form with the yoke ends bearings for horizontally disposed lever supporting or guide bars 9 pivoted as at 10. The ends of these bars are turned inwardly to form ears 11 which are provided with guide or bearing slots 12, through which are adapted to pass operating levers 13 and 14, the outer ends of which are provided with lug engaging hooks 15, their inner inclined ends being pivotally secured to the bearings formed on the yoke ends. Levers 13 are pivoted a short distance below pivots 10, and levers 14 are likewise secured at an equal distance above so that when the operating handle is forced out of its normal position the levers 13 and 14 will be forced outwardly from or inwardly toward the yoke 5, bars 9 controlling their movement.

Rigidly secured to each section 20 of line pipe 21, and at such a distance from the ends thereof so that the hooks 15 will readily engage are a plurality of lugs or U-shaped rings 22 which are preferably formed from stamped sheet metal and riveted or otherwise secured to the sections 20. As the operating lever is forced into the position illustrated in dotted lines in Fig. 3 it will exert a force on the two sections in an opposite direction, thus disconnecting the sections from each other with ease and rapidity.

By the provision of the horizontal pivoted slotted bars 9 which are connected together by a pivoted guiding yoke 23, the operating levers 13 and 14 will always remain in an operative extended position enabling the operator to insert the hooked ends of the operating levers 13 and 14 in the rings 22 expeditiously, the slotted ends of bars 9 serving at the same time to force the bars forwardly or backwardly parallel to the longitudinal axis of the pipe line.

When it is desired to connect a plurality of sections of a pipe line the hooked ends of the levers are inserted in the lugs or rings 22, and when the operating lever is forced in a direction opposite to dotted position shown in Fig. 3, the reverse movement of the section will occur, thus connecting the section to the line.

It will be observed from the foregoing description that we have provided a simple and efficient mechanism that will admirably subserve the purpose for which it was designed in a satisfactory manner.

Having described our invention what we claim as new and desire to secure by Letters Patent is:—

1. The combination with a sectional metallic pipe line, of a handled yoke, a leverage mechanism secured thereto, and means secured to each section of said pipe line adapted to be engaged by said leverage mechanism, whereby to connect or disconnect the sections.

2. The combination with a sectional metallic pipe line, each of said sections being provided with lugs adjacent the ends thereof, of a leverage mechanism, said mechanism adapted to engage the lugs attached to the adjacent sections, whereby the sections may be connected or disconnected.

3. The combination of a sectional pipe line with a plurality of engaging lugs secured near opposite ends of each section, and a manually operated leverage mechanism, said mechanism adapted to engage the lugs secured near the ends of the adjacent sections, whereby the sections so engaged may be drawn apart or forced together.

4. In a device of the class described, a yoke provided with an operating handle and a leverage mechanism pivotally attached to the ends of said yoke, in combination with a sectional metallic pipe line, each of said sections being provided with a plurality of engaging lugs, the lugs near the adjacent ends of two sections adapted to be engaged by said leverage mechanism secured to said yoke, whereby the sections may be forced together or drawn apart.

5. The combination with a sectional metallic pipe line, of a plurality of U-shaped lugs rigidly secured near opposite ends of each section, and a manually operated leverage mechanism, said mechanism comprising a handled yoke, a plurality of hooked levers pivotally secured to the ends of said yoke, the hooks on said lever adapted to engage with the U-shaped lugs attached near the adjacent ends of two pipe sections, whereby when the handled yoke is forced out of a vertical position the hooked levers will force the sections apart or draw them together.

6. The combination with a sectional metallic pipe line, of a plurality of lever engaging means secured thereto, a leverage mechanism, said mechanism adapted to engage the means secured to the pipe line, whereby to connect or disconnect the sections.

7. In a device of the class described, a leverage mechanism comprising a yoke, a plurality of actuating levers secured to said yoke, a guiding means secured to said levers, and means secured to said yoke to actuate said levers.

8. In a device of the class described, a leverage mechanism comprising a handled yoke, a horizontally extending lever supporting bar provided with inturned slotted ends pivotally secured to each of said yoke ends, a pair of oppositely extending hooked levers pivotally secured to said yoke ends, each of said levers extending through the slotted ends of the horizontally extending bars, and a guiding means pivotally secured to and connecting the horizontally extending levers.

9. In a device of the class described, a pipe line composed of a plurality of sections, and a plurality of lever engaging rings rigidly secured to each of said sections.

10. In a device of the class described, a yoke and actuating means therefor, a pair of levers pivotally secured to the yoke ends, and means to support and control the movement of said levers.

11. In a device of the class described, a handled yoke provided with pivoted supporting bars, and a plurality of actuating levers pivoted to the ends of the yoke and adapted to slidingly engage the supporting bars.

12. In a device of the class described, a handled yoke, a pair of lever supporting bars pivoted to said yoke, and two pairs of actuating levers pivotally secured to said yoke, the inner ends of each pair of levers being pivoted at different points on said yoke, said levers adapted to slidingly engage the supporting bars.

13. In a device of the class described, a handled yoke, a horizontally extending lever supporting bar provided with slotted ends pivotally secured to each of said yoke ends, and a pair of oppositely extending hooked levers pivotally secured to said yoke ends, each of said levers extending through the slotted ends of the supporting bars.

In witness that we claim the foregoing we have hereunto subscribed our names this 9th day of November, 1908.

L T GILLETT.
SIDNEY J. ULREY.

Witnesses:
F. C. EILES,
M. M. BURKE.